Oct. 29, 1963

G. OTTEN ETAL 3,109,085

APPARATUS FOR WELDING

Filed March 18, 1960

INVENTOR
GERARDUS OTTEN
PAUL C. VAN DER WILLIGEN
WILHELMUS G. ESSERS
BY

AGENT

Oct. 29, 1963    G. OTTEN ETAL    3,109,085
APPARATUS FOR WELDING
Filed March 18, 1960    4 Sheets-Sheet 2

INVENTOR
GERARDUS OTTEN
PAUL C VAN DER WILLIGEN
WILHELMUS G ESSERS
BY
AGENT

Oct. 29, 1963  G. OTTEN ETAL  3,109,085
APPARATUS FOR WELDING
Filed March 18, 1960  4 Sheets-Sheet 3

INVENTOR
GERARDUS OTTEN
PAUL C VAN DER WILLIGEN
WILHELMUS G ESSERS
BY
AGENT

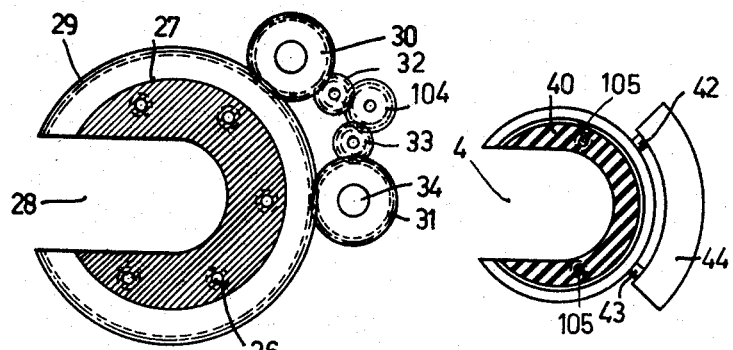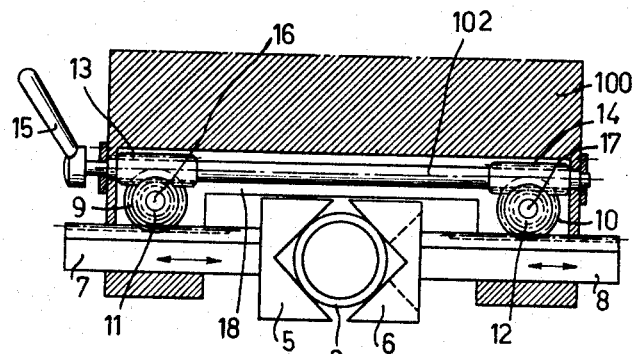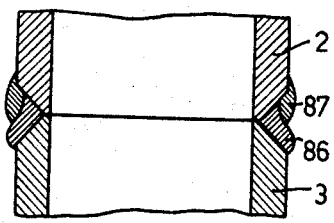

United States Patent Office 3,109,085
Patented Oct. 29, 1963

3,109,085
APPARATUS FOR WELDING
Gerardus Otten, Paul Christiaan Van Der Willigen, and Wilhelmus Gerardus Essers, Eindhoven, Netherlands, assignors to North American Philips Company, Inc., New York, N.Y., a corporation of Delaware
Filed Mar. 18, 1960, Ser. No. 15,906
Claims priority, application Netherlands Mar. 20, 1959
4 Claims. (Cl. 219—60)

Our invention relates to a method of and apparatus for welding members, such as tubes or pipes, which are aligned in an abutting relationship.

As our invention is particularly advantageous for automatically welding, if required by remote control, aligned tubes or pipes which extend vertically, such as employed in nuclear reactors, we shall describe the same in this connection. However, the invention is also useful for welding other types of members extending at other angles, particularly horizontally-extending pipes, such as those employed in oil or gas pipelines.

For repairing or replacing the extremely radio-active pipes or tubes of homogeneous nuclear reactors, it has been proposed to weld the same in an argon atmosphere using a reel of welding wire which is rotated about the pipes while the length of the arc is controlled electronically. Such apparatus has the disadvantage that it is not only expensive but is extremely bulky, which makes its use difficult or impossible in reactors because of limited space around the tubes.

We have found that, quite surprisingly, flawless circumferential welded joints of this type may be obtained by means of welding apparatus which is comparatively simple and inexpensive, and at the same time can be of small size, because it does not utilize reels, filler wires, or a gas supply. Apparatus according to the invention for welding pipes having a diameter of 1 inch to two inches have been constructed with an overall diameter of about 25 inches. In addition, in contradistinction to the argon welding method our method and apparatus is suitable for being used under water.

In accordance with the invention we arrange at least one contact-type electrode in contact with the seam between the members to be welded and, after an arc has been struck, move the same around the seam to thereby produce at least one circumferential bead. In one embodiment of the invention, which is particularly important for welding vertical-extending members, we produce a second circumferential bead above the first bead thereby filling the joint very satisfactorily. In another embodiment we automatically alter the direction of the electrode with respect to the members being welded during the rotation of the electrode around the seam.

The apparatus according to the invention comprises means for securing the same to the members to be welded and means rotatably mounted thereon and adapted to carry at least one electrode so that it is movable toward the members being welded. The apparatus comprises driving means including a motor for rotating the same and actuating other parts thereof. In order that the apparatus will operate automatically, and if desired by remote control, means are provided for energizing the driving means and supplying welding current, and for switching off the device after at least one circumferential bead has been produced.

In one embodiment of the apparatus, which is particularly useful when vertically-extending members are to be welded, we provide means for displacing the electrode or electrodes in the direction of the axis of the members to thereby produce a plurality of relatively-displaced beads. In another embodiment, which is particularly useful for welding in a vertical plane, i.e. horizontally-extending members, we provide means for adjusting, in a predetermined manner and during the welding, the angle between the electrode or electrodes and the members. The invention also includes novel structural features whereby the welding apparatus may be readily placed upon and removed from the members to be welded in a direction perpendicular to the axis thereof.

In order that our invention may be clearly understood and readily carried into effect, we shall described the same in more detail with reference to the accompanying drawing in which:

FIG. 6 is a sectional view of a portion of FIG. 2 taken along line VI—VI thereof, FIG. 7 is a sectional view of a portion of FIG. 1 taken along line VII—VII thereof, FIG. 8 is a sectional view of a portion of FIG. 2 taken along line VIII—VIII thereof, and FIG. 9 is a sectional view on an enlarged scale of two pipes welded together by the method of the invention.

Figure 1:
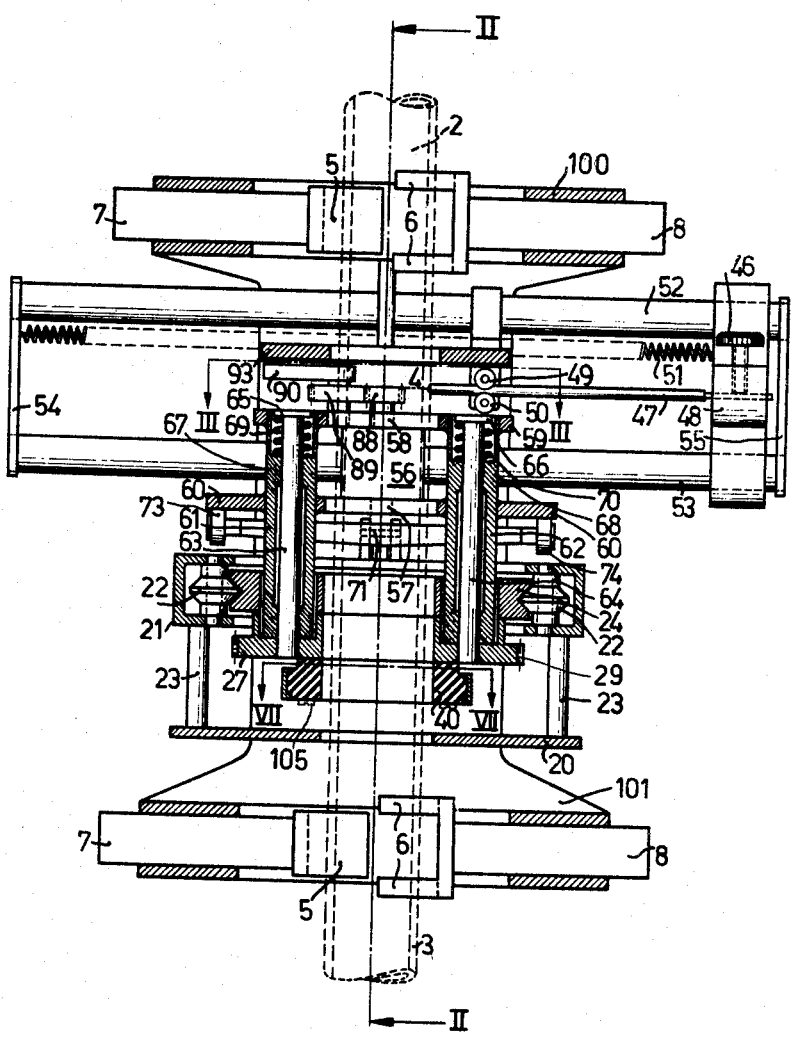
FIGURE 1 is a side view of a welding apparatus according to the invention sectionized along line I—I of FIG. 2.
Figure 2:
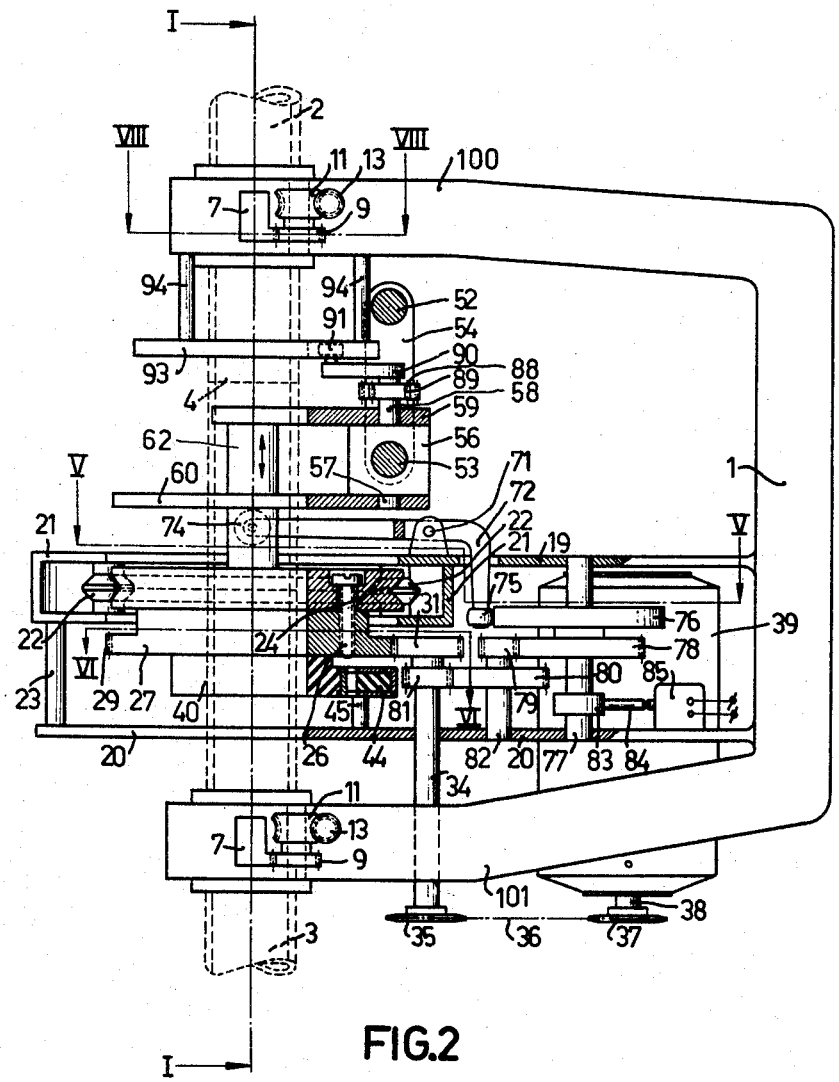
FIG. 2 is a side view of the apparatus sectionized along line II—II of FIG. 1.

Referring to FIGURES 1, 2, and 8, the apparatus illustrated comprises a frame 1 which is adapted to be clamped to the members to be butt welded, shown in dotted lines as vertical pipes 2 and 3 abutting to form a seam 4, and which serves to support other parts of the apparatus and also to maintain the members to be welded in proper position. Frame 1 has extending arms 100 and 101 each carrying it at its free end means for clamping the frame to one of the pipes to be welded, and centering the same with respect thereto. As shown more clearly in FIGURES 1 and 8, the clamping means comprise two clamps 5 and 6, similar to those used in pipe vises, which are fixedly secured to the ends of racks 7 and 8 respectively, slideably mounted on arms 100 and 101. Racks 7 and 8, which are prevented from rotating by a guide surface 18, are movable in the direction of the arrows (see FIG. 8), by spur gears 9 and 10 fixedly secured to shafts 16 and 17 respectively which are rotatably mounted on arms 100 and 101. Worm gears 11 and 12 are secured to shafts 16 and 17 respectively and are actuated by a left-hand worm 13 and a right-hand worm 14 respectively fixedly mounted on a shaft 102 rotatably mounted one on each of the arms 100 and 101 and provided with a handle 15.

Mounted on frame 1 are means for supporting a welding electrode 47 so that it can be rotated about the pipes 2—3. More particularly and as shown in FIGURE 2, frame 1 is provided with a plate-shaped arm 19 which at its free end is formed as a housing 21 which is also supported from a plate-shaped arm 20 of frame 1 by several studs 23 (see FIG. 1). As shown more clearly in FIGURE 5 housing 21 is provided with a radially-extending slot or recess at 25 in order that the apparatus may be positioned over the pipes 2 and 3. Rotatably mounted within housing 1 are a plurality of rollers 22 with conically-shaped edges upon which is mounted disk-shaped support 24 having a V-shaped periphery and, similarly to housing 21, radially-slotted at 25 to permit positioning over the pipes 2 and 3 (see FIG. 5).

Secured to support 24 by several cap screws 26 (see FIGS. 1 and 6) is a circular plate 27 provided with a radially-extending slot 28 which serves the above-mentioned purpose and which is provided on the remainder of its periphery with teeth 29. Plate 29, as well as support 24, is rotated upon rollers 22 by means of a spur gear 31 (see FIG. 2) which engages teeth 29 and is fixedly mounted on one end of a shaft 34, shaft 34 is rotatably mounted on arm 101 and has fixedly mounted on its other end sprocket 35 driven by a chain 36 from a sprocket 37 fixed to the shaft 38 of an electric motor 39 mounted upon the frame 1. In order that slot 28 will not interfere with the rotation of plate 29 a second driving gear 30 (see FIG. 6) similar to gear 31 engages teeth 29 and is driven from gear 31 through intermediate gears 32, 104, and 33 of same size. Gears 30, 32, and 33 are rotatably-mounted on shafts supported from member 20 and in order not to complicate the drawing this construction has not been shown.

The apparatus is provided with means to supply welding current to the electrode 47 including a commutator 40 comprising a ring of insulated material provided with a copper strip at the periphery (see FIGURES 2 and 7) is fixedly secured to plate 27 by means of screws 105. Similarly to the other rotatable apparatus, the commutator 40 is provided with a radial slot 41. Insulatingly supported from arm 20 by means of two pins 45 (only one being shown in FIGURE 2) is a brush holder 44 provided with two brushes 42 and 43 engaging the periphery of commutator 40 (see FIG. 7). Brushes 42 and 43 are spaced apart a distance greater than the width of slot 41 in order that there will be no interruption of the supply of current during the operation of the apparatus. Instead of using two brushes it is, of course, possible to use one single brush having a width greater than the slot 41.

The apparatus includes means to displace the electrode in the axial direction of pipes 2 and 3 including a support formed of two plates 59 and 60 secured to tubular members 61 and 62. Members 61 and 62 are slidably mounted on two pins 63 and 64 respectively having one end fixed to plate 27 and having flanges 65 and 66 on their other ends. Compression springs 69 and 70 located between flanges 65 and 66 and shoulders 67 and 68 of members 61 and 62 tend to restrain the assembly 59—60—62—63 in the position shown in the drawings.

Assembly 59—60—62—63 is moved in an axial direction by means of a lever 72 actuated from shaft 34. More particularly, lever 72 is pivoted at 71 on a bracket secured to arm 19, and is provided at one end with rollers 73 and 74 which engage plate 60 (see FIG. 1). As plates 59 and 60 are provided with radial slits to permit the apparatus to be placed over the pipes, rollers 73 and 74 are spaced apart a sufficient distance so at least one of the rollers will always be in contact with plate 60 during rotation thereof. As shown in FIG. 2, the other end of lever 72 extends through an aperture provided in arm 19 and carries a roller 75 which engages a disk-shaped cam 76 (see FIG. 5) mounted on a shaft 77 rotatably supported from arms 19 and 20. Fixed to shaft 77 is a gear 78 which meshes with a gear 79 fixed to a gear 80 which engages gear 81 fixed to shaft 34. Gears 79 and 80 are secured together and rotatably mounted on a pinion 82 supported on arm 20. Thus, it is seen that cam 76 is driven through the intermediary of the above-mentioned gears from shaft 34 which also drives the above-described rotatable portion 40—27—24 of the apparatus. The gears 78—79—80—81 are so dimensioned that cam 76 will rotate once for every two revolutions of the rotatable assembly 40—27—24 and of electrode 47. Also mounted on shaft 77 is a collar 83 provided with a pin 84 which actuates a micro-switch 85 during each revolution of cam 76.

Figure 5:
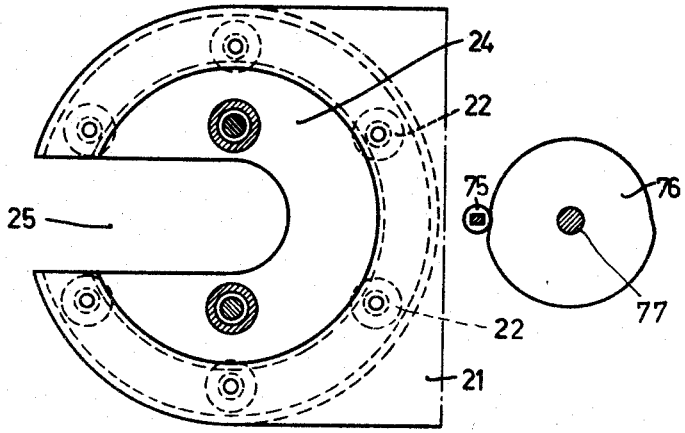
FIG. 5 is a sectional view of a portion of FIG. 2 taken along line V—V thereof.

As shown in FIGURE 5, cam 76 is so shaped that roller 75 travels over a raised peripheral portion during each one-half revolution thereof with the result that lever 72 moves the assembly 59—60—61—62 a small distance in the direction of the double-headed arrow shown in FIG. 2, which movement is imparted to welding electrode 47, once during each two revolutions of the electrode.

Electrode 47 is carried by a supporting assembly which is rotatable with assembly 59—60—61 and 62, but is adjustable with respect thereto in order to change the angle between electrode 47 and pipes 2—3. This first assembly comprises two rods 52 and 53 secured at their ends by end plates 54 and 55. Slideably mounted on rods 52 and 53 and urged by a tension spring 51 secured to end plate 54 so the electrode 47 is pressed against pipes 2—3 in a carriage 48 to which electrode 47 is removably secured by a suitable screw 46 and from which it is insulated. Electrode 47 is guided by two rollers 49 and 50 carried by a bracket secured to rod 52. Rod 53 is fixedly secured to a block 56 (see FIGS. 1 and 2) pivotly mounted on plates 59 and 60 by a pinion 57 and shaft 58. From the above it is seen that electrode 47 is rotatable about the axis of the pipes with support 24 and is adjustable in a plane perpendicular to this axis about the axis of pinion 57 and shaft 58.

Figure 3:
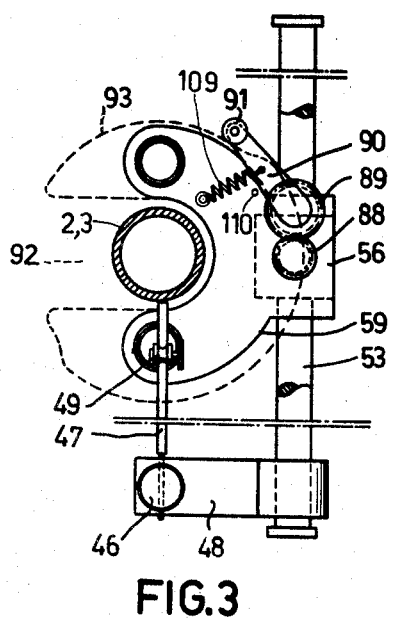
FIG. 3 is a sectional view of a portion of FIG. 1 taken along line III—III thereof.
Figure 4:
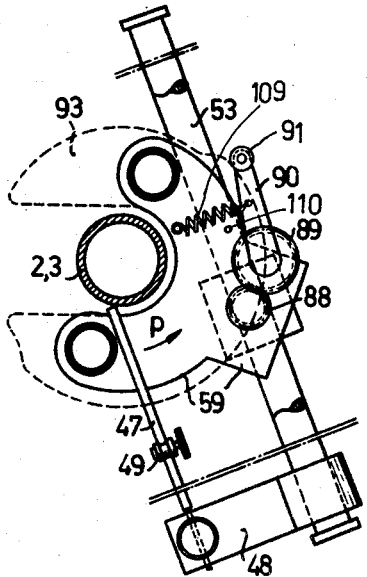
FIG. 4 is the same as FIG. 3 with the parts in a different position.

The apparatus includes means to adjust the angle of the electrode 47 with respect to the pipes 2—3. For this purpose, and as shown in FIGS. 2, 3, and 4, a cam 93 is removably supported from arm 100 by two studs 94 so that its edge is engaged by roller 91 mounted on the end of a lever 90. In order to clear pipes 2 and 3, cam 93 is provided with a radially-extending slot 92. Lever 90 is fixed to a shaft 58 rotatably mounted on plate 59 and carrying a gear 89 which engages a gear 88 fixed on the end of shaft 58. A tension spring 109 holds roller 91 in contact with cam 93 and a stop 110 prevents it from entering slot 92. Thus, the shape of cam 93 determines the angle which electrode 47 forms with the member to be welded, i.e. pipes 2 and 3. In the position shown in FIGURE 3 electrode 47 extends at right angles to the surface of the pipes 2—3, whereas in FIGURE 4 the electrode has moved around the pipes 2—3 in the direction of the arrow p whereby the roller 91 rides upon a raised portion of cam 93 to thereby rotate the assembly into the position shown in which the electrode forms an oblique angle with the pipes 2—3.

By replacing cam 93 with cams of various shapes it is, of course, possible to provide for any predetermined positions of the electrode with respect to the pipes 2—3. For example, the electrode may be mounted in an angular position such as shown in FIGURE 4 for the entire weld, or the position may be varied in any desired manner during the welding operation.

In the embodiment illustrated in FIGURES 3 and 4, which is particularly useful when pipes 2 and 3 are arranged horizontally, the electrode is held at a right angle to the pipes when welding the upper portion, and held at an oblique angle when welding the lower portion to thereby urge the molten welding material upward or at least into a position which is more satisfactory with regard to the force of gravity. The adjustment of the position of the electrode is of particular advantage when welding pipes arranged horizontally, such as oil or gas pipe lines.

The electrode 47 is of the contact type having a semi-conductive coating obtained by the addition of powdered iron thereto, such as described for instance in the Welding Journal, vol. 25, May 1946 and in U.S. Patents 2,504,630 and 2,623,147. Such electrodes form a deep and robust cup at the welding point, and thus a short circuit cannot take place during the welding. In addition the semi-conductive coating makes it possible to automatically strike the welding arc when the welding current is supplied to the electrode. The apparatus is suitable for welding members of various types of steel, but when they are of stainless steel we prefer to use an electrode of such composition that it produces welding metal having substantially the same composition as the member. As a rule we give the electrodes a length which is just sufficient to produce a single circumferential bead as this reduces the size of the apparatus. However, it is possible to further reduce the turning radius of the apparatus by using two electrodes each half the length of electrode 47, and each supported at one end of the electrode holder 52—53—54—55.

In operation, the apparatus is placed over the pipes to be welded and secured and centered with respect thereto by closing the jaws 5 and 6 by means of handles 15. Welding current is applied to electrode 47 by supplying the same to brushes 42 and 43 which are in contact with commutator 40 connected to electrode 47 through screw 46 by a suitable conductor (not shown). At the same time motor 39 is energized thereby rotating shaft 34 which rotates supporting structure 24—27, the electrode-supporting apparatus 52—53—54—55 as well as electrode 47. During the welding, cam 76 makes one revolution while the electrode 47 makes two revolutions. During the first half revolution of cam 76, roller 75 runs over the lower part of the cam (see FIG. 5), whereby the supporting structure 59—60—61—62 together with electrode 47 is rotated, while in the lower position shown to produce a first or lower circumferential bead 86 (see FIG. 9). During the second half revolution of cam 76 roller 75 runs on the raised part of the cam surface whereby the supporting structure 59—60—61—62 together with electrode 47 is lifted axially a short distance against the action of springs 69 and 70, whereby electrode 47 produces the second or upper bead 87. Upon completion of the revolution of cam 76, pin 84 opens the contact 85 which discontinues the supply of welding current and at the same time de-energizes the motor 39 whereby the apparatus is in position.

The apparatus shown in the drawings is suitable for operation in either horizontal or vertical positions. FIGURES 3 and 4 show the apparatus in use while welding horizontal pipes with the top at the right hand side.

It is believed unnecessary to illustrate the electrical circuits necessary to operate the apparatus in the manner described above as such circuits may be of any of the various types well-known in the art. With suitable supply and control circuits, it is possible to actuate the apparatus by remote control whereby the pressing of a button actuates the apparatus and supplies the welding current thereto, and the operation is terminated automatically when the welding has been completed by the actuation of switch 85.

While we have described our invention with reference to specific apparatus and certain constructions, we do not desire to be limited thereto as obvious modifications will readily present themselves to one skilled in this art.

What is claimed is:

1. An apparatus for welding a seam formed between two tubes aligned in abutting relationship with a consumable contact-type electrode, comprising a frame, means to secure said frame to the tubes to support the apparatus therefrom and hold the tubes in alignment, a first support rotatably mounted on said frame and provided with a radial slot to permit the apparatus to be placed over the tubes from the side thereof, a second support movably mounted on said first support so as to be displaceable thereto axially of the tubes, electrode holding means rotatably mounted on said second support, resilient means urging said second support toward said first support to thereby hold the electrode in contact with the tubes, electrode holding means rotatably mounted on said second support, means mounted on said frame for rotating said supports and for displacing said second support relatively to the first support, and means for rotating said electrode holder with respect to said second support to thereby change the angle between the electrode and the tubes.

2. An apparatus for welding a seam formed between two tubes aligned vertically in abutting relationship, comprising a frame, a clamping device secured to said frame and adapted to engage said tubes to thereby support the apparatus, a first support rotatably mounted on said frame so as to be rotatable about said tubes, said first support being provided with a radial slot to permit the apparatus to be placed over the tubes from the side thereof, a second support movably mounted on said first support so as to be displaceable axially of the tubes, resilient means urging said second support toward said first support, an electrode supporting assembly mounted on said second support and including a carriage adapted to support a contact-type electrode and being movable in a direction perpendicular to the axis of said tubes, spring means urging said carriage toward the tubes to thereby maintain the electrode in contact therewith, and means mounted on said frame for rotating said first support and for displacing said second support.

3. An apparatus for welding a seam formed between two tubes aligned horizontally in abutting relationship, comprising a frame, a clamping device secured to said frame and adapted to engage said tubes to thereby support the apparatus, a support rotatably mounted on said frame so as to be rotatable about said tubes, said support being provided with a radial slot to permit the apparatus to be placed over the tubes from the side thereof, an electrode supporting assembly movably mounted on said support so as to be rotatable in a vertical plane, said assembly including a carriage adapted to support a contact-type electrode and slideably supported so as to be movable in a direction perpendicular to the axis of said tubes, spring means urging said carriage toward said members to thereby maintain the electrode in contact therewith, and means for rotating said electrode supporting assembly with respect to said support to thereby change the angle between the electrode and the tubes.

4. An apparatus for welding a seam formed between two tubes aligned in abutting relationship, comprising a frame, a clamping device secured to said frame and adapted to engage said tubes to thereby support the apparatus, a first support rotatably mounted on said frame so as to be rotatable about said tubes, said support being provided with a radial slot to permit the apparatus to be placed over the tubes from the side thereof, a second support movably mounted on said first support so as to be displaceable axially of the tubes, resilient means urging said second support toward said first support, an electrode supporting assembly rotatably mounted on said second support, said assembly including a carriage adapted to support a contact-type electrode and movable in a direction perpendicular to the axis of said tubes, means urging said carriage toward the tubes to thereby maintain said electrode in contact therewith, means mounted on said frame for rotating said first support and for displacing said second support, and means for rotating said electrode holder with respect to said second support to thereby change the angle between the electrode and the tubes.

References Cited in the file of this patent

UNITED STATES PATENTS

| | | |
|---|---|---|
| Re. 13,970 | Strohmenger | Aug. 24, 1915 |
| 2,013,630 | Goldsborough | Sept. 3, 1935 |
| 2,204,545 | Faunce | June 18, 1940 |
| 2,439,740 | Johnson | Apr. 13, 1948 |
| 2,459,047 | Scharf | Jan. 11, 1949 |
| 2,721,248 | Kirkpatrick | Oct. 18, 1955 |
| 2,795,689 | McNutt | June 11, 1957 |
| 2,894,111 | McNutt | July 7, 1959 |
| 2,906,851 | Kitrell | Sept. 29, 1959 |